US012576736B2

(12) United States Patent
Hashida et al.

(10) Patent No.: US 12,576,736 B2
(45) Date of Patent: Mar. 17, 2026

(54) BATTERY ELECTRIC VEHICLE

(71) Applicant: TOYOTA JIDOSHA KABUSHIKI KAISHA, Aichi-ken (JP)

(72) Inventors: Tatsuhiro Hashida, Aichi-ken (JP); Ikuo Ando, Aichi-ken (JP); Nanae Iwasaki, Aichi-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 101 days.

(21) Appl. No.: 18/593,983

(22) Filed: Mar. 4, 2024

(65) Prior Publication Data

US 2024/0300350 A1      Sep. 12, 2024

(30) Foreign Application Priority Data

Mar. 8, 2023      (JP) ................................. 2023-035775

(51) Int. Cl.
| | |
|---|---|
| *B60L 53/00* | (2019.01) |
| *B60K 11/02* | (2006.01) |
| *B60L 15/00* | (2006.01) |
| *B60L 50/60* | (2019.01) |
| *B60L 53/24* | (2019.01) |
| *H02J 7/00* | (2006.01) |
| *H02P 5/74* | (2006.01) |

(52) U.S. Cl.
CPC .............. *B60L 53/24* (2019.02); *B60K 11/02* (2013.01); *B60L 15/007* (2013.01); *B60L 50/60* (2019.02); *H02J 7/0063* (2013.01); *H02J 7/007192* (2020.01); *H02P 5/74* (2013.01); *B60L 2210/40* (2013.01); *B60L 2240/425* (2013.01); *B60L 2260/40* (2013.01)

(58) Field of Classification Search
CPC ........ B60L 53/24; B60L 15/007; B60L 50/60; B60L 2210/40; B60L 2240/425; B60L 2260/40; B60L 1/02; B60L 2220/42; B60L 2220/54; B60L 2240/525; B60K 11/02; H02J 7/0063; H02J 7/007192; H02P 5/74; Y02T 10/70; Y02T 10/7072
See application file for complete search history.

(56) References Cited

U.S. PATENT DOCUMENTS

| | | | |
|---|---|---|---|
| 2016/0280218 A1* | 9/2016 | Oba ...................... | B60W 20/50 |
| 2017/0137016 A1* | 5/2017 | Yang ..................... | B60W 20/13 |

(Continued)

FOREIGN PATENT DOCUMENTS

| | | |
|---|---|---|
| CN | 111391719 A | 7/2020 |
| CN | 112389234 A | 2/2021 |

(Continued)

*Primary Examiner* — Ramya P Burgess
*Assistant Examiner* — Brittany Renee Peko
(74) *Attorney, Agent, or Firm* — HAUPTMAN HAM, LLP

(57) ABSTRACT

The battery electric vehicle selects and executes a charge mode from a first charge mode in which power supplied from an external power source device to a first neutral point of a first motor is supplied to a power storage device via the first motor and a first inverter, and a second charge mode in which power supplied from the external power source device to a second neutral point of a second motor is supplied to the power storage device via the second motor and a second inverter, based on at least one of temperatures of the first and second motors and temperatures of the first and second inverters.

8 Claims, 6 Drawing Sheets

(56) References Cited

U.S. PATENT DOCUMENTS

| | | | | |
|---|---|---|---|---|
| 2017/0257055 | A1* | 9/2017 | Kitaori | H02P 29/60 |
| 2019/0202319 | A1* | 7/2019 | Barazowski | B60L 58/19 |
| 2020/0177014 | A1 | 6/2020 | Lee et al. | |
| 2023/0097060 | A1 | 3/2023 | Ling et al. | |
| 2024/0092203 | A1* | 3/2024 | Namuduri | B60L 53/24 |

FOREIGN PATENT DOCUMENTS

| | | | | | |
|---|---|---|---|---|---|
| CN | 113022344 | A | | 6/2021 | |
| CN | 112398185 | B | | 2/2023 | |
| JP | 2007-068340 | A | | 3/2007 | |
| JP | 2009-038958 | A | | 2/2009 | |
| JP | 2010178593 | A | * | 8/2010 | B60K 6/445 |
| JP | 2016063587 | A | * | 4/2016 | B60K 1/02 |

* cited by examiner

BATTERY ELECTRIC VEHICLE

CROSS-REFERENCE TO RELATED APPLICATION

The present disclosure claims priority to Japanese Patent Application No. 2023-035775 filed on Mar. 8, 2023, which is incorporated herein by reference in its entirety including specification, drawings and claims.

TECHNICAL FIELD

The present disclosure relates to a battery electric vehicle.

BACKGROUND

A proposed configuration of a battery electric vehicle includes a power storage device, a motor that has a three-phase coil, an inverter that converts DC power from the power storage device to three-phase AC power and supplies it to the motor, and a controller that controls the inverter (see, for example, Patent Document 1). In this battery electric vehicle, the controller controls the inverter by setting a duty of switching elements of the inverter during external charging, in which power supplied from an external power source device to a neutral point of the motor is supplied to the power storage device via the motor and the inverter.

CITATION LIST

Patent Literature

PTL 1: US2020/0177014A1

SUMMARY

The battery electric vehicle may include a power storage device, first and second motors with a three-phase coil respectively, and first and second inverters that convert DC power from the power storage device to three-phase AC power and supply it to the first and second motors, respectively. In this case, when the battery electric vehicle continues to use only one of the first motor and first inverter or the second motor and second inverter during external charging, a relatively large imbalance between the two temperatures may occur.

The main object of the battery electric vehicle of the present disclosure is to suppress the relatively large imbalance between the temperature of the first motor and the temperature of the second motor, and between the temperature of the first inverter and the temperature of the second inverter.

In order to achieve the above main object, the battery electric vehicle of the present disclosure employs the following configuration.

The present disclosure is directed to a battery electric vehicle. The battery electric vehicle includes a power storage device, first and second motors with a three-phase coil respectively, first and second inverters that is configured to convert DC power from the power storage device to three-phase AC power and supply the three-phase AC power to the first and second motors, respectively, and a controller that is programmed to control the first and second inverters. The controller is programmed to select and execute a charge mode from a first charge mode in which power supplied from an external power source device to a first neutral point of the first motor is supplied to the power storage device via the first motor and the first inverter, and a second charge mode in which power supplied from the external power source device to a second neutral point of the second motor is supplied to the power storage device via the second motor and the second inverter, based on at least one of temperatures of the first and second motors and temperatures of the first and second inverters.

In the battery electric vehicle according to this aspect of the present disclosure, the controller is programmed to select and execute a charge mode from a first charge mode in which power supplied from an external power source device to a first neutral point of the first motor is supplied to the power storage device via the first motor and the first inverter, and a second charge mode in which power supplied from the external power source device to a second neutral point of the second motor is supplied to the power storage device via the second motor and the second inverter, based on at least one of temperatures of the first and second motors and temperatures of the first and second inverters. As a result, the battery electric vehicle can suppress a relatively large imbalance between the temperature of the first motor and the temperature of the second motor, and between the temperature of the first inverter and the temperature of the second inverter, compared to a case where the controller always sets the charge mode to the first charge mode and the case where the controller always sets the charge mode to the second charge mode.

DESCRIPTION OF EMBODIMENTS

Figure 1:
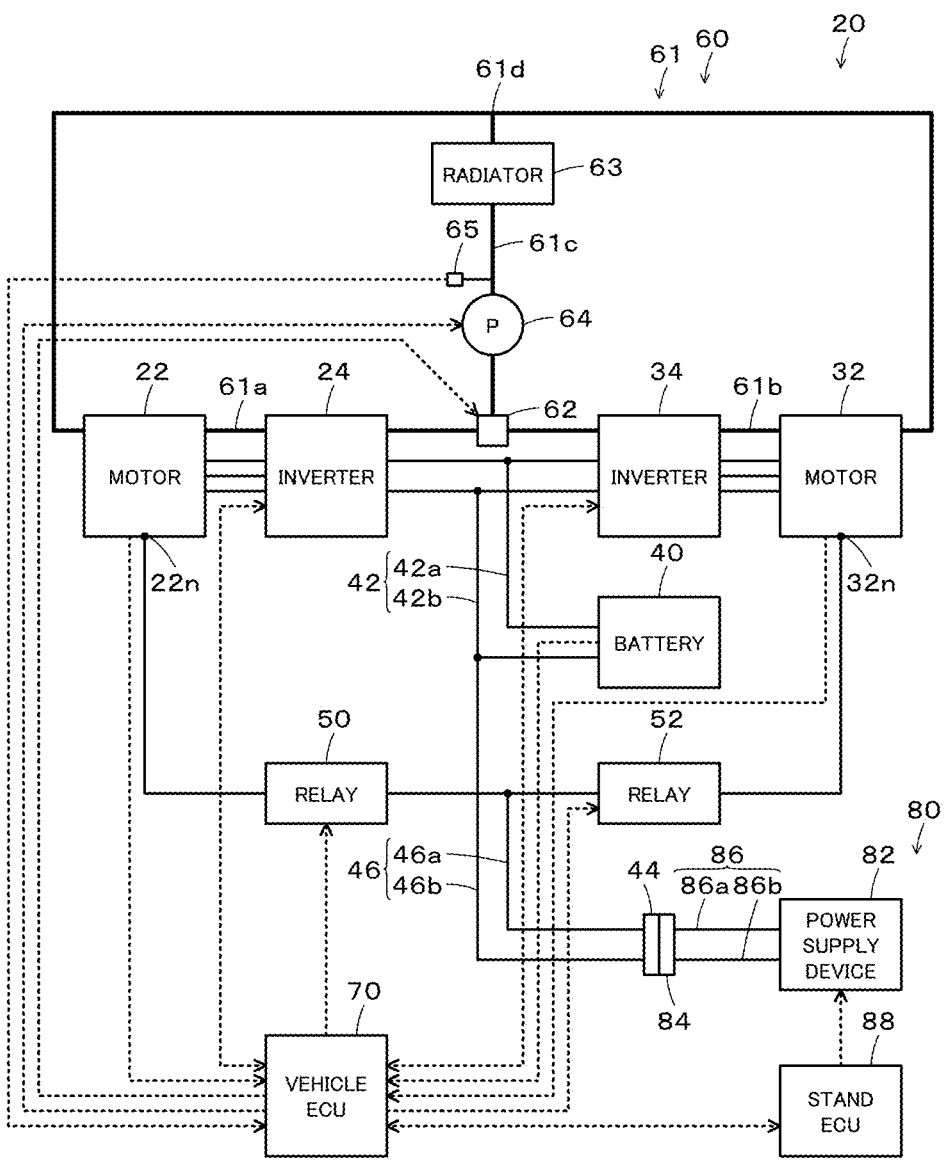
FIG. 1 is a schematic configuration diagram of a battery electric vehicle and a charging stand.
Figure 2:
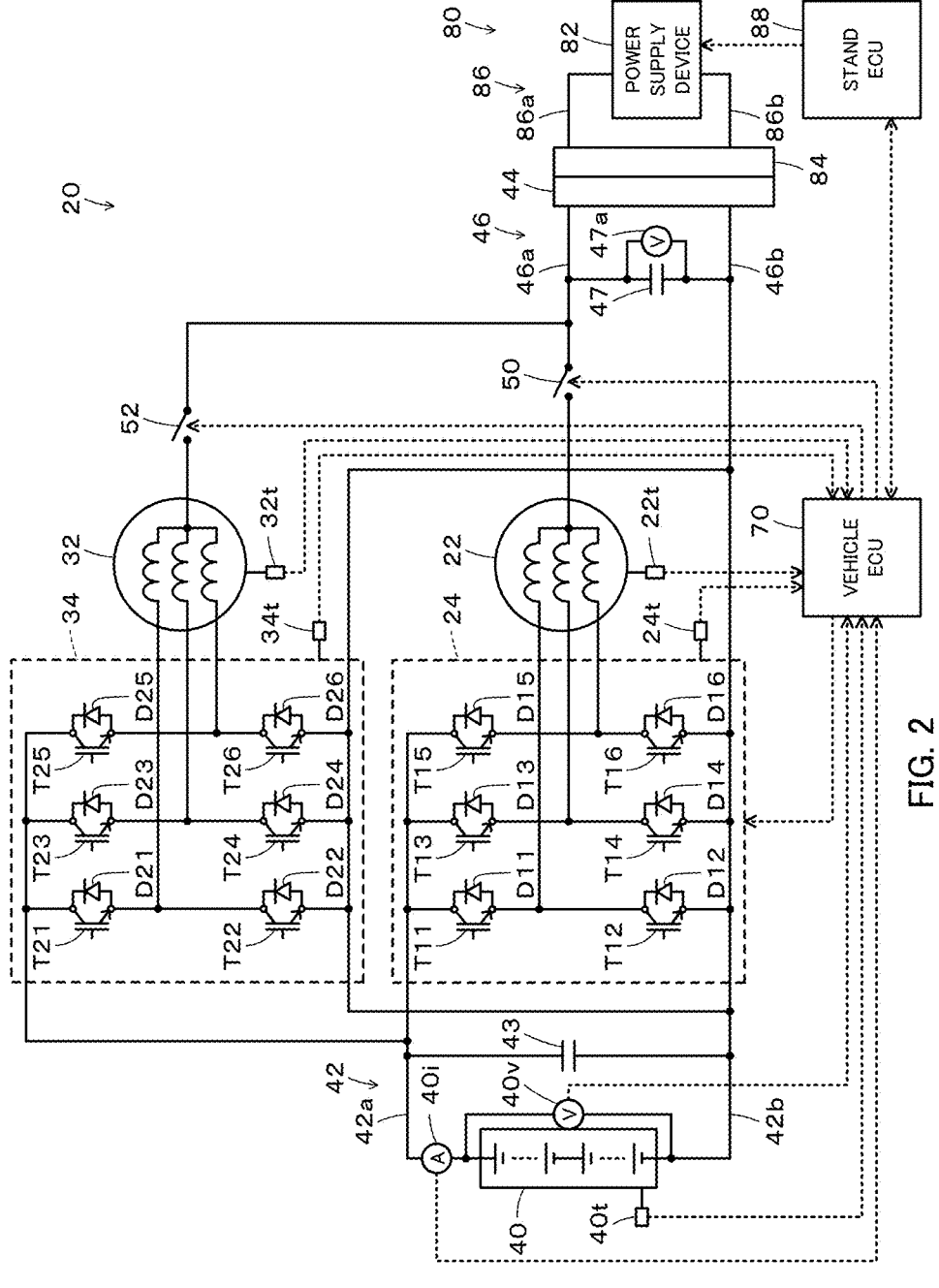
FIG. 2 is the schematic configuration diagram of the battery electric vehicle and the charging stand.

The embodiment of the present disclosure is described with reference to the drawings. FIG. 1 and FIG. 2 are both schematic configuration diagrams of a battery electric vehicle 20 of the embodiment and a charging stand 80 as an external power supply device. As shown in FIG. 1 and FIG. 2, the battery electric vehicle 20 includes motors 22 and 32, inverters 24 and 34, a battery 40 as a power storage device, a device side connector 44, relays 50 and 52, a cooling device 60, and an electronic control unit for the vehicle (vehicle ECU 70).

The motors 22 and 32 are configured as three-phase AC motors, respectively. The motors 22 and 32 include a rotor with permanent magnets embedded in the rotor core and a stator with a three-phase coil wound around the stator core, respectively. Connections of the three-phase coils of the motors 22 and 32 form the neutral points $22n$ and $32n$ (first and second neutral points), respectively. The rotors of the motors 22 and 32 are incorporated in the left and right drive wheels, respectively. In the embodiment, the motors 22 and 32 have same rated values (specifications).

The inverters 24 and 34 are connected to the battery 40 via the positive side line $42a$ and the negative side line $42b$ of the power line 42. The inverter 24 has six transistors T11 to T16 as switching elements and six diodes D11 to D16. The transistors T11-T16 are arranged in pairs such that they are source and sink side to the positive side line 42a and the negative side line 42b, respectively. Each of the connection points of the two paired transistors T11-116 is connected to each of the three-phase coil of the motor 22. The six diodes D11-D16 are connected in parallel to each of the six transistors T11-T16. The inverter 24 converts DC power from the battery 40 to three-phase AC power and supplies it to the motor 22. The inverter 34 is configured in the same manner as the inverter 24. The inverter 34 has six transistors T21 to T26 and six diodes D11 to D16. The inverter 34 converts the DC power from the battery 40 into the three-phase AC power and supplies it to the motor 32. A capacitor 43 is connected to the positive side line 42a and the negative side line 42b. In the embodiment, the inverters 24 and 34 have same rated values (specifications).

The battery 40 is configured as a lithium ion rechargeable battery or nickel metal hydride battery, for example. The battery 40 is connected to the inverters 24 and 34 via the positive side line 42a and the negative side line 42b, as described above. The device side connector 44 is configured to be connectable to a stand side connector 84 of the charging stand 80. The device side connector 44 is connected to the neutral points 22n and 32n of the motors 22 and 32 via the positive side line 46a of the power line 46 and the relays 50 and 52. The device side connector 44 is also connected to the negative side line 42b via the negative side line 46b of the power line 46. A capacitor 47 is connected to the positive side line 46a and the negative side line 46b.

The relays 50 and 52 connect and disconnect the neutral points 22n and 32n of the motors 22 and 32 to the positive side line 46a by turning on and off, respectively. When the relay 50 is on, a three-phase boost converter is configured by the motor 22 and the inverter 24 between the positive side line 46a and the negative side line 46b of the power line 46 and the positive side line 42a and the negative side line 42b of the power line 42. When the relay 52 is on, a three-phase boost converter is configured by the motor 32 and the inverter 34 between the positive side line 46a and the negative side line 46b of the power line 46 and the positive side line 42a and the negative side line 42b of the power line 42.

The cooling device 60 has a circulation flow path 61, a switcher 62, a radiator 63, and an electric pump 64. The circulation flow path 61 has a first flow path 61a, a second flow path 61b, and a third flow path 61c. The first flow path 61a is a flow path for circulating cooling water from the switcher 62 through the inverter 24 and the motor 22 to the confluence 61d. The second flow path 61b is a flow path for circulating the cooling water from the switcher 62 through the inverter 34 and the motor 32 to the confluence 61d. The third flow path 61c is a flow path for circulating the cooling water from the confluence 61d through the radiator 63 and the electric pump 64 to the switcher 62. The switcher 62 is configured to switch the circulation of the cooling water in three ways: both the first flow path 61a and the second flow path 61b, only the first flow path 61a, and only the second flow path 61b. The electric pump 64 pumps the cooling water in the third flow path 61c.

The vehicle ECU 70 includes a microcomputer. The microcomputer has a CPU, ROM, RAM, flash memory, I/O ports, and communication ports. The vehicle ECU 70 inputs signals from various sensors. For example, the vehicle ECU 70 inputs rotational positions of the rotors of the motors 22 and 32 from rotational position sensors and phase currents of each phase of the motors 22 and 32 from current sensors. The vehicle ECU 70 also inputs temperatures $\alpha$m1 and $\alpha$m2 of the motors 22 and 32 from temperature sensors 22t and 32t, and temperatures $\alpha$i1 and $\alpha$i2 of the inverters 24 and 34 from temperature sensors 24t and 34t. The vehicle ECU 70 also inputs a voltage Vb of the battery 40 from a voltage sensor 40v, a current Ib of the battery 40 from a current sensor 40i, and a temperature $\alpha$b of the battery 40 from a temperature sensor 40t. The vehicle ECU 70 also inputs a voltage Vc of the capacitor 47 from a voltage sensor 47a and a cooling water temperature $\alpha$w, which is a temperature of the cooling water in the circulation flow path 61 (third flow path 61c), from a water temperature sensor 65.

The vehicle ECU 70 outputs various control signals. For example, the vehicle ECU 70 outputs control signals to the transistors T11 to T16 and T21 to T26 of the inverters 24 and 34, control signals to the relays 50 and 52, and control signals to the electric pump 64. The vehicle ECU 70 calculates electric angles $\theta$e1 and $\theta$e2 and rotation speeds Nm1 and Nm2 of the motors 22 and 32 based on the rotational positions of the rotors of the motors 22 and 32. The vehicle ECU 70 calculates the state of charge SOC of the battery 40 based on the integrated value of the current Ib of the battery 40. The vehicle ECU 70 sets the input limit Win, which is the allowable input power of the battery 40, based on the state of charge SOC of the battery 40 and the temperature $\alpha$b of the battery 40. The vehicle ECU 70 is capable of communicating with an electronic control unit (stand ECU) 88 of the charging stand 80 at home or at a charging station.

The charging stand 80 is located at a home or charging station, or the like. The charging stand 80 includes a power supply device 82, the stand side connector 84, and the stand ECU 88. The power supply device 82 is connected to the stand side connector 84 via the positive side line 86a and the negative side line 86b of the power line 86. The power supply device 82 is configured to convert AC power from a power system to DC power and to adjust output voltage and output power. The stand side connector 84 is configured to be connectable to the device side connector 44 of the battery electric vehicle 20. When the stand side connector 84 is connected to the device side connector 44, the positive side line 86a is connected to the positive side line 46a, and the negative side line 86b is connected to the negative side line 46b, respectively.

The stand ECU 88 includes a microcomputer. The microcomputer has a CPU, ROM, RAM, flash memory, I/O ports, and communication ports. The stand ECU 88 inputs an output voltage Vs of the power supply device 82 from a voltage sensor 83v and an output current Is of the power supply device 82 from a current sensor 83i. The stand ECU 88 outputs a control signal to the power supply device 82. The stand ECU 88 calculates an output power Ps based on the output voltage Vs and the output current Is. The stand ECU 88 is configured to communicate with the vehicle ECU 70 of the battery electric vehicle 20.

The following describes the operations of the battery electric vehicle 20 and more specifically the operations during external charging. The external charging is the charging of the battery 40 using the power from the power supply device 82 of the charging stand 80. In this embodiment, the battery electric vehicle 20 performs the external charging while switching the charging mode between the first charge mode and the second charge mode. The first charge mode is a mode in which the power supplied from the power supply device 82 to the neutral point 22n of the motor 22 is supplied to the battery 40 via the motor 22 and the inverter 24. The second charge mode is a mode in which the power supplied from the power supply device 82 to the neutral point 32$n$ of the motor 32 is supplied to the battery 40 via the motor 32 and the inverter 34.

Figure 3:
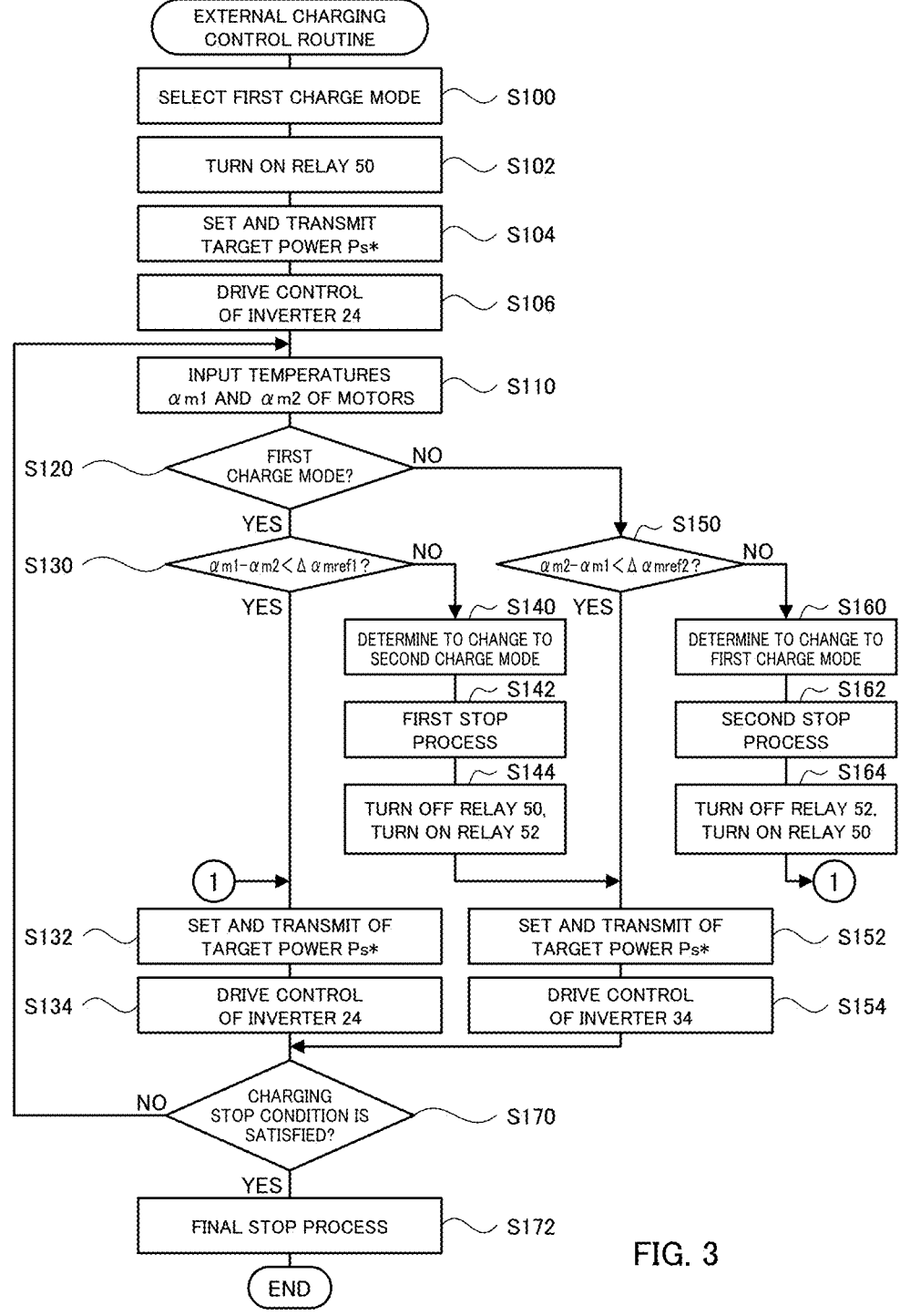
FIG. 3 is a flowchart showing an example of an external charging control routine.

FIG. 3 is a flowchart showing an example of an external charging control routine executed by the vehicle ECU 70. This routine is executed when the charging start condition is satisfied while the device side connector 44 and the stand side connector 84 are connected. The charging start condition is used, for example, as a condition where the user instructs to start charging the battery 40. At start of the routine, both relays 50 and 52 are off. During execution of the routine, the vehicle ECU 70 controls the switcher 62 and the electric pump 64 such that the cooling water is distributed in both the first flow path 61$a$ and the second flow path 61$b$.

When the external charging control routine of FIG. 3 is executed, the vehicle ECU 70 selects the first charge mode (step S100). The vehicle ECU 70 turns on the relay 50 (step S102). The vehicle ECU 70 sets the target power Ps* and transmits it to the stand ECU 88 (step S104). The vehicle ECU 70 performs drive control of the inverter 24 (step S106). The target power Ps* is set, for example, within the input limit Win of the battery 40. The stand ECU 88 controls the power supply device 82 such that the output power Ps is equal to the target power Ps*. In the drive control of the inverter 24, the duty of the transistors T11 to T16 is set based on the voltage ratio between the voltage Vb of the battery 40 and the voltage Vc of the capacitor 47.

The vehicle ECU 70 inputs the temperatures $\alpha$m1 and $\alpha$m2 of the motors 22 and 32 (step S110). The vehicle ECU 70 determines whether the charging mode is the first charge mode or the second charge mode (step S120). When the charging mode is the first charge mode, the vehicle ECU 70 compares the value ($\alpha$m1–$\alpha$m2) obtained by subtracting the temperature $\alpha$m2 of the motor 32 from the temperature $\alpha$m1 of the motor 22 with a threshold value $\Delta\alpha$mref1 (step S130). When the value ($\alpha$m1–$\alpha$m2) is less than the threshold value $\Delta\alpha$mref1, the vehicle ECU 70 determines to hold the charging mode. In this case, the vehicle ECU 70 sets the target power Ps* and transmits it to the stand ECU 88 (step S132). The vehicle ECU 70 performs the drive control of the inverter 24 (step S134). The vehicle ECU 70 determines whether the charging stop condition is satisfied (step S170). The charging stop condition is used, for example, as an OR condition, such as a condition where the state of charge SOC of the battery 40 reaches equal to or higher than the threshold value Sth, a condition where the user instructs to stop charging the battery 40, and the like. When the charging stop condition is not satisfied in step S170, the vehicle ECU 70 returns to the process of step S110.

When the value ($\alpha$m1–$\alpha$m2) is equal to or higher than the threshold value $\Delta\alpha$mref1 in step S130, the vehicle ECU 70 determines that the charging mode is required to be switched to the second charge mode (step S140). In this case, the vehicle ECU 70 executes a first stop process (step S142). In the first stop process, the vehicle ECU 70 stops the drive control of the inverter 24 and sends a power interruption command to the stand ECU 88. The stand ECU 88 suspends the power supply device 82. This suspends the external charging. The vehicle ECU 70 turns off the relay 50 and turns on the relay 52 (step S144). The vehicle ECU 70 sets the target power Ps* and transmits it to the stand ECU 88 (step S152). The vehicle ECU 70 performs the drive control of the inverter 34 (step S154) and moves to the process of step S170. In the drive control of the inverter 34, the duty of transistors T21 to T26 is set based on the voltage ratio between the voltage Vb of the battery 40 and the voltage Vc of the capacitor 47. The battery electric vehicle 20 can suppress a further increase in the temperature $\alpha$m1 of the motor 22 by switching the charging mode to the second charge mode. As a result, the battery electric vehicle 20 can suppress a relatively large imbalance between the temperature $\alpha$m1 of the motor 22 and the temperature $\alpha$m2 of the motor 32.

When the charging mode is the second charge mode in step S120, the vehicle ECU 70 compares the value ($\alpha$m2–$\alpha$m1) obtained by subtracting the temperature $\alpha$m1 of the motor 22 from the temperature $\alpha$m2 of the motor 32 with a threshold value $\Delta\alpha$mref2 (step S150). The threshold value $\Delta\alpha$mref2 is, for example, the same value as the threshold value $\Delta\alpha$mref1. When the value ($\alpha$m2–$\alpha$m1) is less than the threshold value $\Delta$ $\alpha$mref2, the vehicle ECU 70 determines to hold the charging mode. In this case, the vehicle ECU 70 sets the target power Ps* and transmits it to the stand ECU 88 (step S152). The vehicle ECU 70 performs the drive control of the inverter 34 (step S154), and moves to the process of step S170.

When the value ($\alpha$m2–$\alpha$m1) is equal to or higher than the threshold value $\Delta\alpha$mref2 in step S150, the vehicle ECU 70 determines that the charging mode is required to be switched to the first charge mode (step S160). In this case, the vehicle ECU 70 executes a second stop process (step S162). In the second stop process, the vehicle ECU 70 stops the drive control of the inverter 34 and sends the power interruption command to the stand ECU 88. The stand ECU 88 suspends the power supply device 82. This suspends the external charging. The vehicle ECU 70 turns off the relay 52 and turns on the relay 50 (step S164). The vehicle ECU 70 sets the target power Ps* and transmits it to the stand ECU 88 (step S132). The vehicle ECU 70 performs the drive control of the inverter 24 (step S134) and moves to the process of step S170. By switching the charging mode to the first charge mode, the battery electric vehicle 20 can suppress a further increase in the temperature $\alpha$m2 of the motor 32. As a result, the battery electric vehicle 20 can suppress the relatively large imbalance between the temperature $\alpha$m1 of the motor 22 and the temperature $\alpha$m2 of the motor 32.

When the charging stop condition is satisfied in step S170, the vehicle ECU 70 executes a final stop process (step S172) and this routine is terminated. In the final stop process, the vehicle ECU 70 stops the drive control of the one being driven of the inverters 24 and 34 and sends a power end command to the stand ECU 88. The stand ECU 88 shuts down the power supply device 82. This terminates the external charging.

In the battery electric vehicle 20 of the embodiment described above, the vehicle ECU 70 switches the charging mode to the second charge mode when the charging mode is the first charge mode and the value ($\alpha$m1–$\alpha$m2) reaches equal to or higher than the threshold value $\Delta\alpha$mref1. Also, the vehicle ECU 70 switches the charging mode to the first charge mode when the charging mode is the second charge mode and the value ($\alpha$m2–$\alpha$m1) reaches equal to or higher than the threshold value $\Delta\alpha$mref2. This can suppress a relatively large imbalance between the temperature $\alpha$m1 of the motor 22 and the temperature $\alpha$m2 of the motor 32. As a result, when the battery electric vehicle 20 is subsequently driven, a relatively large imbalance between the drive performance of the motor 22 and the drive performance of the motor 32 can be suppressed.

The vehicle ECU 70 may compare the value ($\alpha$i1–$\alpha$i2) obtained by subtracting the temperature $\alpha$i2 of the inverter 34 from the temperature $\alpha$i1 of the inverter 24 with a threshold value Δαiref1, instead of the process of step S130 of the embodiment described above. That is, when the value (αi1−αi2) is less than the threshold value Δαiref1, the vehicle ECU 70 may hold the charging mode, and when the value (αi1−αi2) is equal to or higher than the threshold value Δαiref1, the vehicle ECU 70 may switch the charging mode to the second charge mode. The vehicle ECU 70 may compare the value (αi2−αi1) obtained by subtracting the temperature αi1 of the inverter 24 from the temperature αi2 of the inverter 34 with a threshold value Δαiref2, instead of the process of step S150. That is, when the value (αi2−αi1) is less than the threshold value Δαiref2, the vehicle ECU 70 may hold the charging mode, and when the value (Δi2−αi1) is equal to or higher than the threshold value Δαiref2, the vehicle ECU 70 may switch the charging mode to the first charge mode. The threshold values Δαierf1 and Δαiref2 are, for example, the same value. This can suppress a relatively large imbalance between the temperatures αi1 of the inverter 24 and αi2 of the inverter 34.

Figure 4:
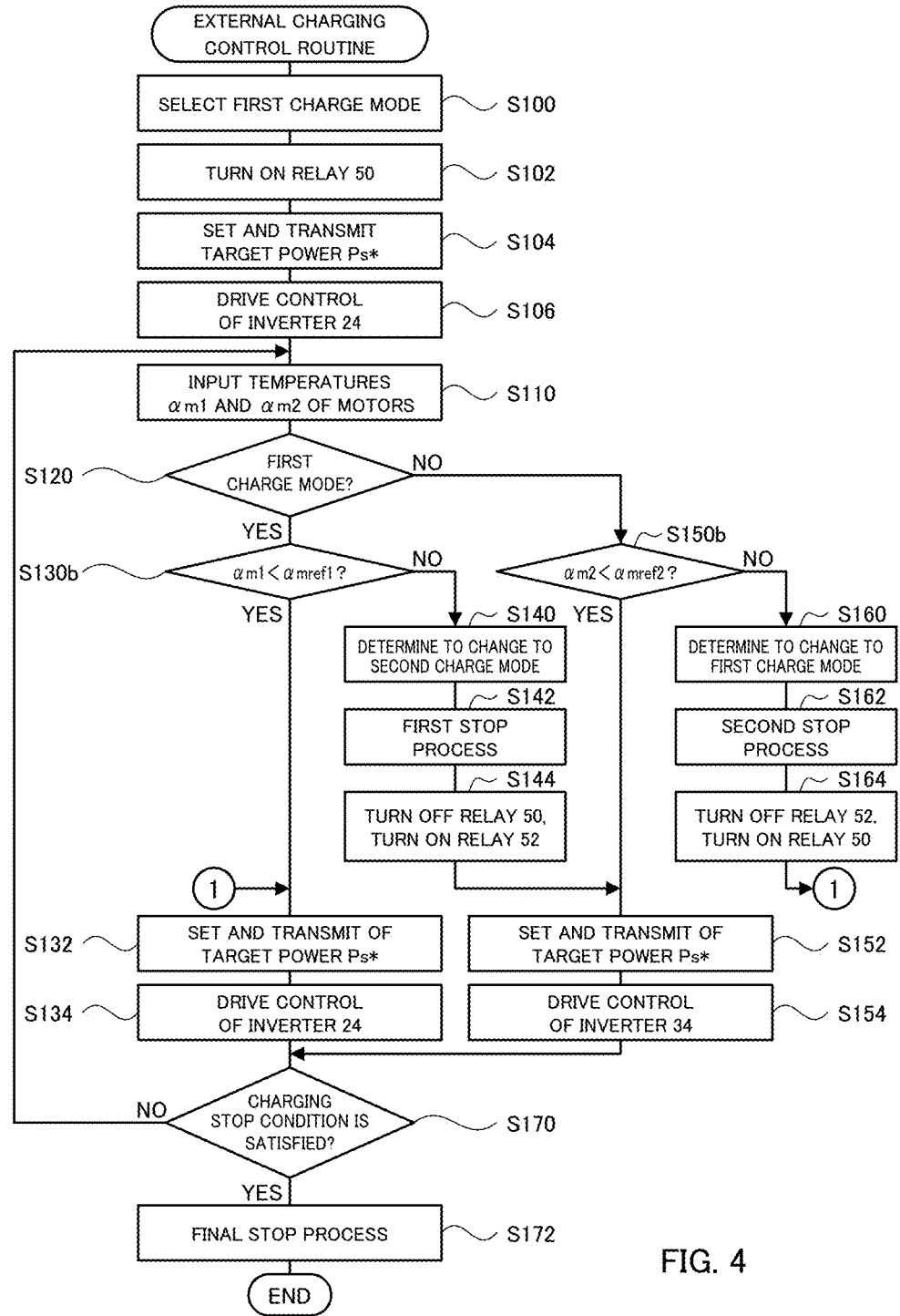
FIG. 4 is a flowchart showing an example of the external charging control routine.

The vehicle ECU 70 may execute the external charging control routine of FIG. 4, instead of the external charging control routine of FIG. 3 of the embodiment described above. The external charging control routine of FIG. 4 differs from the external charging control routine of FIG. 3 in that the processes of steps S130 and S150 are replaced by processes of steps S130b and S150b. In the external charging control routine of FIG. 4, when the charging mode is the first charge mode in step S120, the vehicle ECU 70 compares the temperature αm of the motor 22 with a threshold value αmref1 (step S130b). When the temperature αm1 of the motor 22 is less than the threshold value αmref1, the vehicle ECU 70 determines to hold the charging mode and moves to the process of step S132. On the other hand, when the temperature αm1 of the motor 22 is equal to or higher than the threshold value αmref1, the vehicle ECU 70 determines that the charge mode is required to be switched to the second charge mode (step S140) and moves to the process of step S142. In this case, as in the embodiment described above, the battery electric vehicle 20 can suppress the further increase of the temperature αm1 of the motor 22 by switching the charging mode to the second charge mode. As a result, the battery electric vehicle 20 can suppress the relatively large imbalance between the temperature αm1 of the motor 22 and the temperature αm2 of the motor 32.

When the charging mode is the second charge mode in step S120, the vehicle ECU 70 compares the temperature αm of the motor 32 with a threshold value αmref2 (step S150b). The threshold value 60 mref2 is, for example, the same value as the threshold value αmref1. When the temperature αm2 of the motor 32 is less than the threshold value αmref2, the vehicle ECU 70 determines to hold the charging mode and moves to the process of step S152. On the other hand, when the temperature αm2 of the motor 32 is equal to or higher than the threshold value αmref2, the vehicle ECU 70 determines that the charging mode is required to be switched to the first charge mode (step S160) and moves to the process of step S162. In this case, as in the embodiment described above, the battery electric vehicle 20 can suppress the further increase of the temperature αm2 of the motor 32 by switching the charging mode to the first charge mode. As a result, the battery electric vehicle 20 can suppress the relatively large imbalance between the temperature αm1 of the motor 22 and the temperature αm2 of the motor 32.

The vehicle ECU 70 may compare the temperature αi1 of the inverter 24 with a threshold value αiref1, instead of the process of step S130b of the external charging control routine of FIG. 4. That is, when the temperature ail of the inverter 24 is less than the threshold value αiref1, the vehicle ECU 70 may hold the charging mode, and when the temperature αi1 of the inverter 24 is equal to or higher than the threshold value αiref1, the vehicle ECU 70 may switch the charging mode to the second charge mode. The vehicle ECU 70 may compare the temperature αi2 of the inverter 34 with a threshold value αiref2, instead of the process of step S150b. That is, when the temperature αi2 of the inverter 34 is less than the threshold value αiref2, the vehicle ECU 70 may hold the charging mode, and when the temperature αi2 of the inverter 34 is equal to or higher than the threshold value αiref2, the vehicle ECU 70 may switch the charging mode to the first charge mode. The threshold values αierf1 and αiref2 are, for example, the same value. This can suppress the relatively large imbalance between the temperatures ail of inverter 24 and αi2 of inverter 34.

Figure 5:
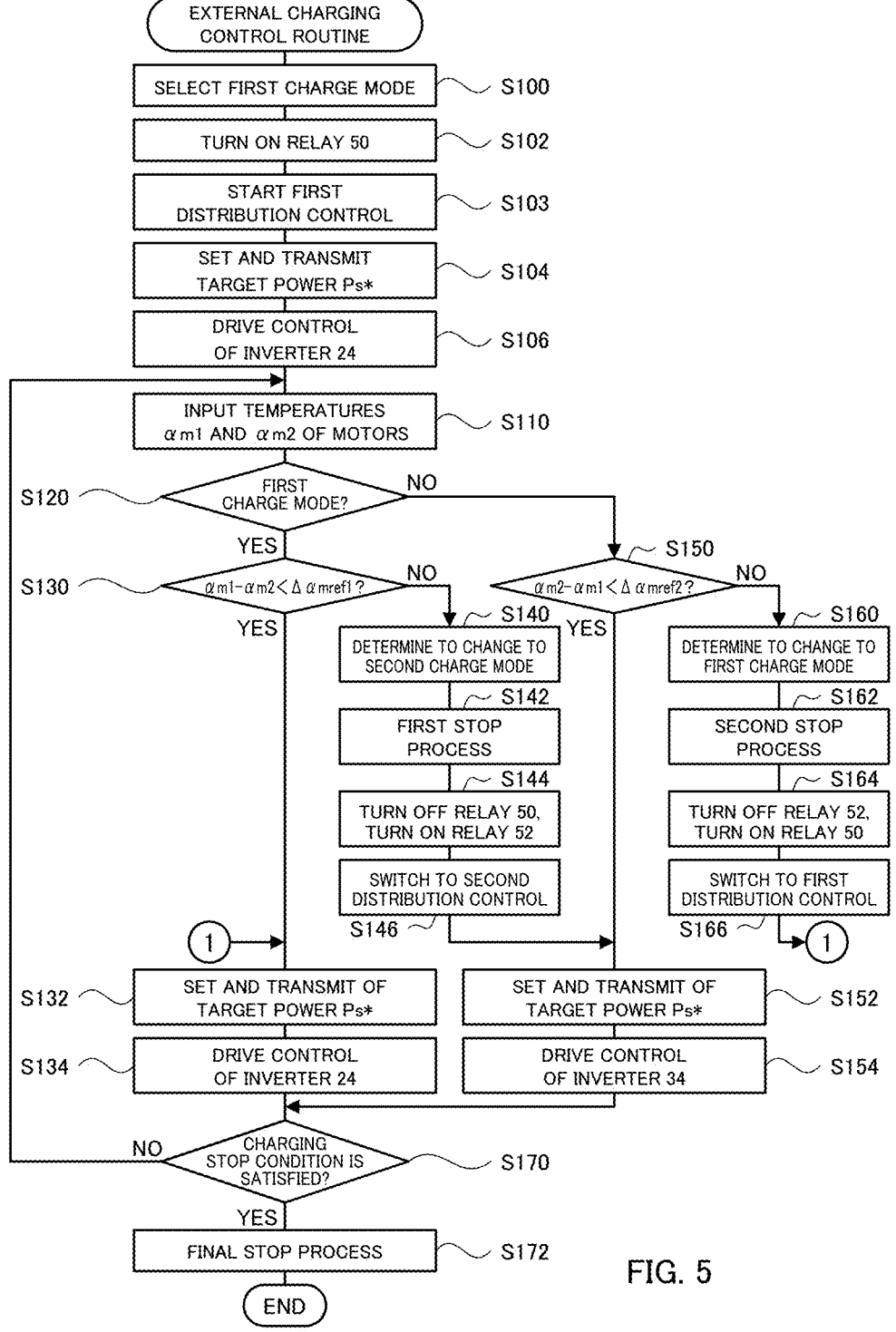
FIG. 5 is a flowchart showing an example of the external charging control routine.

The vehicle ECU 70 may execute the external charging control routine of FIG. 5, instead of the external charging control routine of FIG. 3 of the embodiment described above. The external charging control routine of FIG. 5 differs from the external charging control routine of FIG. 3 in that processes of steps S103, S146, and S166 are added. In the external charging control routine of FIG. 5, when the vehicle ECU 70 turns on the relay 50 in step S102, the vehicle ECU 70 starts executing a first distribution control (step S103). In the first distribution control, the vehicle ECU 70 controls the switcher 62 and the electric pump 64 such that the cooling water is distributed only in the first flow path 61a among the first flow path 61a and the second flow path 61b. That is, in the first charge mode, the vehicle ECU 70 executes the first distribution control. In this way, the battery electric vehicle 20 can suppress the temperature rise of the motor 22 and the inverter 24.

When the vehicle ECU 70 turns off the relay 50 and turns on the relay 52 in step S144, the vehicle ECU 70 switches from the first distribution control to the second distribution control (step S146) and moves to the process of step S152. In the second distribution control, the vehicle ECU 70 controls the switcher 62 and the electric pump 64 such that the cooling water is distributed only in the second flow path 61b among the first flow path 61a and the second flow path 61b. That is, in the second charge mode, the vehicle ECU 70 executes the second distribution control. In this way, the battery electric vehicle 20 can suppress the temperature rise of the motor 32 and the inverter 34. When the vehicle ECU 70 turns off the relay 52 and turns on the relay 50 in step S164, the vehicle ECU 70 switches from the second distribution control to the first distribution control (step S166) and moves to the process of step S132.

Figure 6:
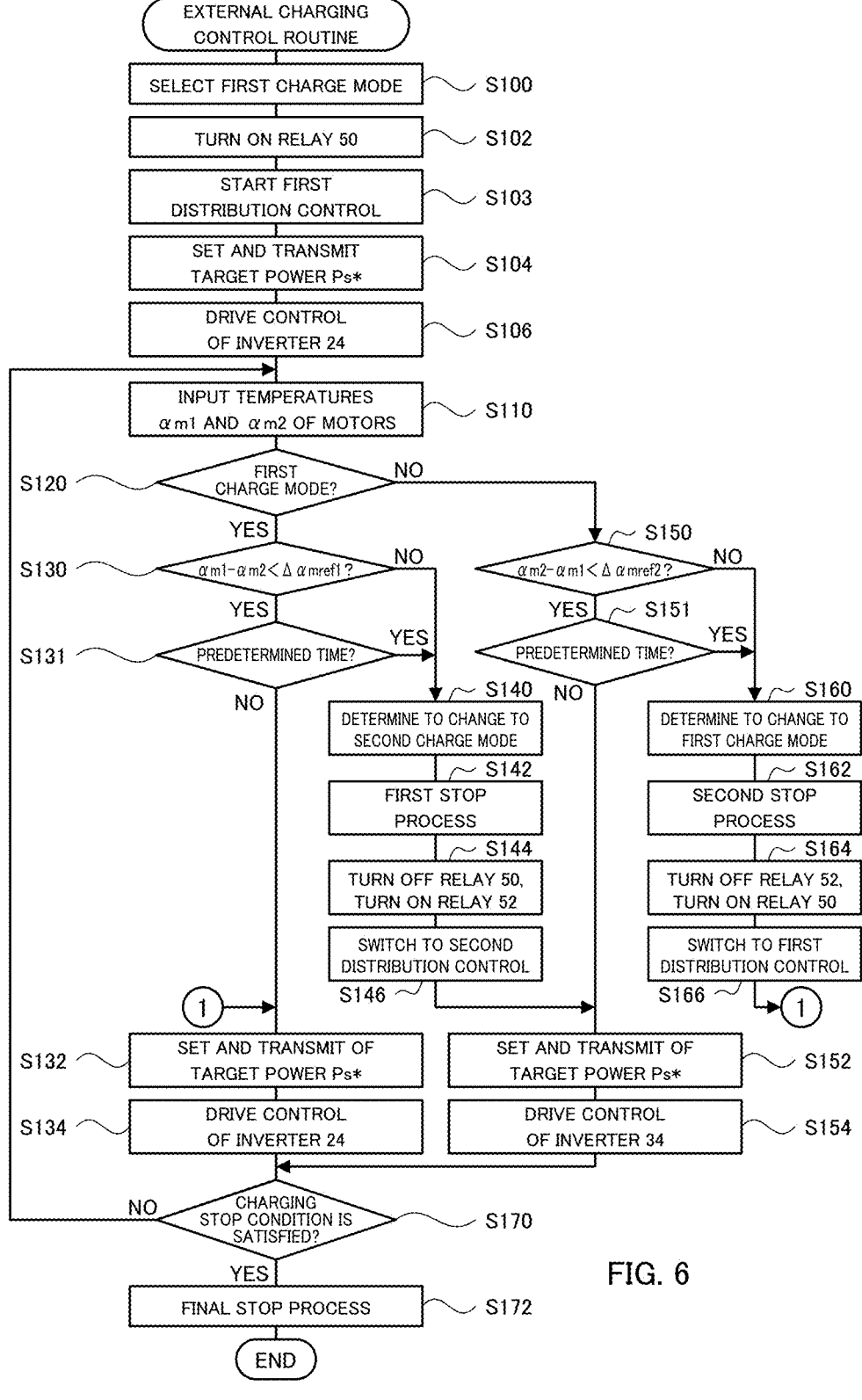
FIG. 6 is a flowchart showing an example of the external charging control routine.

The vehicle ECU 70 may execute the external charging control routine of FIG. 6, instead of the external charging control routine of FIG. 5. The external charging control routine of FIG. 6 differs from the external charging control routine of FIG. 5 in that processes of steps S131 and S151 are added. In the external charging control routine of FIG. 6, when the charging mode is the first charge mode in step S120 and the value (αm1−αm2) is less than the threshold value Δαmref1 in step S130, the vehicle ECU 70 determines whether the charging mode has continued in the first charge mode for a predetermined time T1 (step S131). When the charging mode has not continued in the first charge mode for the predetermined time T1, the vehicle ECU 70 determines to hold the charging mode and moves to the process of step S132. On the other hand, when the charging mode has continued in the first charge mode for the predetermined time T1, the vehicle ECU 70 determines that the charging mode is required to be switched to the second charge mode (step S140) and moves to the process of step S142. This can suppress the duration of the first charge mode from becoming too long.

When the charging mode is the second charge mode in step S120 and the value ($\alpha$m2–$\alpha$m1) is less than the threshold value $\Delta\alpha$mref2 in step S150, the vehicle ECU 70 determines whether the charging mode has continued in the second charge mode for the predetermined time T2 (step S151). When the charging mode has not continued in the second charge mode for the predetermined time T2, the vehicle ECU 70 determines to hold the charging mode and moves to the process of step S152. On the other hand, when the charging mode continues in the second charge mode for the predetermined time T2, the vehicle ECU 70 determines that the charging mode is required to be switched to the first charge mode (step S160) and moves to the process of step S162. The predetermined time T2 is, for example, the same as the predetermined time T1. This can suppress the duration of the second charge mode from becoming too long.

The vehicle ECU 70 may switch the charging mode to the second charge mode when at least one of first to fourth conditions is satisfied, instead of the processes of steps S130 and S130b of the external charging control routine of FIG. 3 to FIG. 6. The first condition is a condition that the value ($\alpha$m1–$\alpha$m2) is equal to or higher than the threshold value $\Delta\alpha$mref1. The second condition is a condition that the value ($\alpha$i1–$\alpha$i2) is equal to or higher than the threshold value $\Delta\alpha$iref1. The third condition is a condition that the temperature $\alpha$m1 of motor 22 is equal to or higher than the threshold value $\alpha$mref1. The fourth condition is a condition that the temperature $\alpha$i1 of the inverter 24 is equal to or higher than the threshold value $\alpha$iref1. The vehicle ECU 70 may switch the charging mode to the first charge mode when at least one of fifth to eighth conditions is satisfied, instead of the processes of steps S150 and S150b. The fifth condition is a condition that the value ($\alpha$m2–$\alpha$m1) is equal to or higher than the threshold value $\Delta\alpha$mref2. The sixth condition is a condition that the value ($\alpha$i2–$\alpha$i1) is equal to or higher than the threshold value $\Delta\alpha$iref2. The seventh condition is a condition that the temperature $\alpha$m2 of motor 32 is equal to or higher than the threshold value $\alpha$mref2. The eighth condition is a condition that the temperature $\alpha$i2 of the inverter 34 is equal to or higher than the threshold value $\alpha$iref2.

In the embodiments described above, the motors 22 and 32 may be used to drive the front and rear drive wheels, respectively, instead of being used to drive the left and right drive wheels, respectively.

In the embodiments described above, the power storage device may be a capacitor instead of the battery 40.

In the embodiments described above, the form of the battery electric vehicle 20 including the motors 22 and 32 may be replaced by the form of a hybrid electric vehicle including the motors 22 and 32 and an engine, or by a fuel cell electric vehicle including the motors 22 and 32 and a fuel cell.

In the battery electric vehicle of the present disclosure, the controller may be programmed to switch the charge mode to the second charge mode, when the charge mode is the first charge mode and a value obtained by subtracting the temperature of the second motor from the temperature of the first motor reaches equal to or higher than a first threshold value, or when the charge mode is the first charge mode and a value obtained by subtracting the temperature of the second inverter from the temperature of the first inverter reaches equal to or higher than a second threshold value, and the controller may be programmed to switch the charge mode to the first charge mode, when the charge mode is the second charge mode and a value obtained by subtracting the temperature of the first motor from the temperature of the second motor reaches equal to or higher than a third threshold value, or when the charge mode is the second charge mode and a value obtained by subtracting the temperature of the first inverter from the temperature of the second inverter reaches equal to or higher than a fourth threshold value.

In the battery electric vehicle of the present disclosure, the controller may be programmed to switch the charge mode to the second charge mode, when the charge mode is the first charge mode and the temperature of the first motor reaches equal to or higher than a first threshold value, or when the charge mode is the first charge mode and the temperature of the first inverter reaches equal to or higher than a second threshold value, and the controller may be programmed to switch the charge mode to the first charge mode, when the charge mode is the second charge mode and the temperature of the second motor reaches equal to or higher than a third threshold value, or when the charge mode is the second charge mode and the temperature of the second inverter reaches equal to or higher than a fourth threshold value.

In the battery electric vehicle of the present disclosure, the battery electric vehicle may further include a cooling device that is configured to distribute a cooling water in one or both of a first flow path including the first motor and the first inverter and a second flow path including the second motor and the second inverter, wherein the controller may be programmed to distribute the cooling water only in the first flow path among the first and second flow paths when the charge mode is the first charge mode, and the controller may be programmed to distribute the cooling water only in the second flow path among the first and second flow paths when the charge mode is the second charge mode. In this case, the controller may be programmed to switch the charge mode to the second charge mode when the charge mode continues in the first charge mode for a first predetermined time, and the controller may be programmed to switch the charge mode to the first charge mode when the charge mode continues in the second charge mode for a second predetermined time.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is applicable to the manufacturing industries of the battery electric vehicle and so on.

What is claimed is:

1. A battery electric vehicle, comprising:
   a power storage device;
   first and second motors with a three-phase coil respectively;
   first and second inverters configured to convert DC power from the power storage device to three-phase AC power and supply the three-phase AC power to the first and second motors, respectively; and
   a controller programmed to control the first and second inverters,
   wherein the controller is programmed to select and execute a charge mode from a first charge mode in which power supplied from an external power source device to a first neutral point of the first motor is supplied to the power storage device via the first motor and the first inverter, and a second charge mode in which power supplied from the external power source device to a second neutral point of the second motor is supplied to the power storage device via the second motor and the second inverter, based on at least one of a temperature difference between temperatures of the first and second motors, or a temperature difference between temperatures of the first and second inverters.

2. A battery electric vehicle, comprising:

a power storage device;

first and second motors with a three-phase coil respectively;

first and second inverters configured to convert DC power from the power storage device to three-phase AC power and supply the three-phase AC power to the first and second motors, respectively; and a controller programmed to control the first and second inverters, wherein the controller is programmed to select and execute a charge mode from a first charge mode in which power supplied from an external power source device to a first neutral point of the first motor is supplied to the power storage device via the first motor and the first inverter, and a second charge mode in which power supplied from the external power source device to a second neutral point of the second motor is supplied to the power storage device via the second motor and the second inverter, based on at least one of temperatures of the first and second motors and temperatures of the first and second inverters, and the controller is programmed to switch the charge mode to the second charge mode, when the charge mode is the first charge mode and a value obtained by subtracting the temperature of the second motor from the temperature of the first motor reaches equal to or higher than a first threshold value, or when the charge mode is the first charge mode and a value obtained by subtracting the temperature of the second inverter from the temperature of the first inverter reaches equal to or higher than a second threshold value, and the controller is programmed to switch the charge mode to the first charge mode, when the charge mode is the second charge mode and a value obtained by subtracting the temperature of the first motor from the temperature of the second motor reaches equal to or higher than a third threshold value, or when the charge mode is the second charge mode and a value obtained by subtracting the temperature of the first inverter from the temperature of the second inverter reaches equal to or higher than a fourth threshold value.

3. The battery electric vehicle according to claim 1, wherein the controller is programmed to switch the charge mode to the second charge mode, when the charge mode is the first charge mode and the temperature of the first motor reaches equal to or higher than a first threshold value, or when the charge mode is the first charge mode and the temperature of the first inverter reaches equal to or higher than a second threshold value, and the controller is programmed to switch the charge mode to the first charge mode, when the charge mode is the second charge mode and the temperature of the second motor reaches equal to or higher than a third threshold value, or when the charge mode is the second charge mode and the temperature of the second inverter reaches equal to or higher than a fourth threshold value.

4. The battery electric vehicle according to claim 1, further comprising:

a cooling device that is configured to distribute a cooling water in one or both of a first flow path including the first motor and the first inverter and a second flow path including the second motor and the second inverter, wherein the controller is programmed to distribute the cooling water only in the first flow path among the first and second flow paths when the charge mode is the first charge mode, and the controller is programmed to distribute the cooling water only in the second flow path among the first and second flow paths when the charge mode is the second charge mode.

5. The battery electric vehicle according to claim 4, wherein the controller is programmed to switch the charge mode to the second charge mode when the charge mode continues in the first charge mode for a first predetermined time, and the controller is programmed to switch the charge mode to the first charge mode when the charge mode continues in the second charge mode for a second predetermined time.

6. The battery electric vehicle according to claim 1, wherein the controller is programmed to switch the charge mode between the first charge mode and the second charge mode, in response to the temperature difference between the temperatures of the first motor and the second motor being equal to or higher than a first predetermined threshold value, or in response to the temperature difference between the temperatures of the first inverter and the second inverter being equal to or higher than a second predetermined threshold value.

7. The battery electric vehicle according to claim 6, wherein during the first charge mode, in response to the temperature difference between the temperatures of the first motor and the second motor being less than the first predetermined threshold value, the controller is programmed to determine whether the first charge mode has continued for a predetermined time.

8. The battery electric vehicle according to claim 7, wherein in response to a determination by the controller that the first charge mode has not continued for the predetermined time, the controller is programmed to determine to hold the first charge mode, and in response to a determination by the controller that the first charge mode has continued for the predetermined time, the controller is programmed to determine to switch to the second charge mode.

* * * * *